US008714769B2

(12) United States Patent
Cristoforo

(10) Patent No.: US 8,714,769 B2
(45) Date of Patent: May 6, 2014

(54) LIGHT SYSTEM

(75) Inventor: Michael Cristoforo, Palm City, FL (US)

(73) Assignee: Sight Saver, LLC, Palm City, FL (US)

( * ) Notice: Subject to any disclaimer, the term of this patent is extended or adjusted under 35 U.S.C. 154(b) by 573 days.

(21) Appl. No.: 12/878,713

(22) Filed: Sep. 9, 2010

(65) Prior Publication Data

US 2011/0063827 A1 Mar. 17, 2011

Related U.S. Application Data

(60) Provisional application No. 61/357,791, filed on Jun. 23, 2010, provisional application No. 61/242,839, filed on Sep. 16, 2009.

(51) Int. Cl.
*F21L 4/00* (2006.01)
*H04M 1/22* (2006.01)

(52) U.S. Cl.
USPC .......................................... 362/191; 362/396

(58) Field of Classification Search
USPC ........... 362/647, 648, 198, 191, 35, 147, 150, 362/167, 170, 171, 187, 188, 196, 197, 199, 362/200, 202, 208
See application file for complete search history.

(56) References Cited

U.S. PATENT DOCUMENTS

| | | | | |
|---|---|---|---|---|
| 1,294,752 | A | 2/1919 | Ballard | |
| 4,244,011 | A * | 1/1981 | Hammel et al. | 362/183 |
| 4,506,317 | A * | 3/1985 | Duddy | 362/396 |
| 4,541,555 | A * | 9/1985 | Miree | 224/420 |
| 4,678,153 | A | 7/1987 | Maddock et al. | |
| 4,897,768 | A * | 1/1990 | Thul | 362/191 |
| 5,521,803 | A | 5/1996 | Eckert et al. | |
| 5,564,817 | A * | 10/1996 | Palmer | 362/191 |
| 5,717,276 | A | 2/1998 | Hsu | |
| 6,190,020 | B1 * | 2/2001 | Hartley | 362/184 |
| 6,280,050 | B1 | 8/2001 | Bird et al. | |
| 6,718,136 | B2 | 4/2004 | Bird et al. | |
| 6,764,194 | B1 | 7/2004 | Cooper | |
| 6,874,908 | B2 | 4/2005 | Sharrah et al. | |
| 7,311,418 | B2 | 12/2007 | Zeller et al. | |
| 7,390,105 | B2 | 6/2008 | Nelson et al. | |
| 7,422,356 | B2 | 9/2008 | Hama et al. | |
| 7,425,082 | B1 | 9/2008 | Jones | |
| 7,481,554 | B2 | 1/2009 | Anderson et al. | |
| 7,510,295 | B2 | 3/2009 | Shih | |
| D591,439 | S | 4/2009 | Cristoforo | |
| D599,046 | S | 8/2009 | Cristoforo | |
| D602,620 | S | 10/2009 | Cristoforo | |
| 7,618,152 | B2 | 11/2009 | Tsung | |
| D609,376 | S | 2/2010 | Cristoforo et al. | |
| D619,285 | S | 7/2010 | Cristoforo | |
| D649,668 | S | 11/2011 | Cristoforo | |

(Continued)

FOREIGN PATENT DOCUMENTS

| | | |
|---|---|---|
| DE | 202007001258 | 4/2007 |
| WO | WO2011034773 | 3/2011 |

*Primary Examiner* — Jason Moon Han
*Assistant Examiner* — Danielle Allen
(74) *Attorney, Agent, or Firm* — McHale & Slavin, P.A.

(57) ABSTRACT

A light system is provided. It includes a lamp in a light assembly. The light assembly is pivotally mounted to a mount device by a pivot assembly. The light assembly may be pivoted about two different axes of rotation to direct the light at an area of interest. With the light system mounted on a person, movement by the person can redirect the light beam as desired.

16 Claims, 5 Drawing Sheets

(56) References Cited

U.S. PATENT DOCUMENTS

| | | | | |
|---|---|---|---|---|
| 2002/0080608 | A1* | 6/2002 | Wienhold | 362/249 |
| 2003/0067771 | A1 | 4/2003 | Kung | |
| 2004/0141317 | A1 | 7/2004 | Sun | |
| 2005/0018420 | A1 | 1/2005 | Parsons | |
| 2005/0248932 | A1* | 11/2005 | Waters | 362/105 |
| 2006/0061991 | A1 | 3/2006 | Yeh | |
| 2006/0120066 | A1 | 6/2006 | Huang | |
| 2007/0030672 | A1 | 2/2007 | Offiler et al. | |
| 2007/0177375 | A1 | 8/2007 | Petzl | |
| 2009/0059607 | A1 | 3/2009 | Yoon | |
| 2009/0116230 | A1 | 5/2009 | Young | |
| 2010/0053944 | A1 | 3/2010 | Yao-Lin | |
| 2010/0103653 | A1 | 4/2010 | Liu | |
| 2010/0103656 | A1 | 4/2010 | Cho | |

* cited by examiner

LIGHT SYSTEM

CROSS REFERENCE TO RELATED APPLICATIONS

This application is related to U.S. Pat. No. D591,439 issued on Apr. 28, 2009, entitled "Ear Hook with Removable Light"; U.S. Pat. No. D599,046 issued on Aug. 25, 2009, entitled "Ear Hook with Adjustable Boom Mounted Light"; U.S. Pat. No. D602,620 issued on Oct. 20, 2009, entitled "Eye Glass Clip with Adjustable Boom Mounted Light"; U.S. Pat. No. D609,376 issued on Feb. 2, 2010, entitled "Clip-On Light"; U.S. Pat. No. D619,285 issued on Jul. 6, 2010, entitled "Eyeglass Clip with Adjustable Boom Mounted Light"; U.S. application Ser. No. 29/338,460 filed Jun. 11, 2009, entitled "Ear Hook with Adjustable Boom Mounted Light"; U.S. Application 61/357,791 filed Jun. 23, 2010, entitled "Attachable Illumination System"; and claims priority under 35 USC 119(e) to the U.S. Provisional Application 61/242,839 filed Sep. 16, 2009, entitled "Light System", the contents of which are incorporated herein by reference.

FIELD OF INVENTION

The present invention relates to a light system adapted for multiple mounts for use on a human or portable mounts. The light is mounted on a multi-axis pivot assembly to permit selective pointing of a beam of light at an area of interest. The light is removably mounted to the pivot assembly. Different mounts may be provided in a kit.

BACKGROUND OF THE INVENTION

Light systems are used in areas where low light can inhibit human activities including such things as repairs, observations, reading and the like. When properly directed, little light is actually needed for such activities. Large lights, such as ceiling lights, often result in shadows being cast on areas of interest since the person is often positioned between the area of interest and the light source. Also, some such lights are designed to light large areas and cannot be directed without affecting illumination in some areas meant to be illuminated.

Some solutions to directed lighting include such things as so-called work lights on articulated arms that may be positioned adjacent an area of interest. These lights tend to be large and require adjustment if the user moves and needs to redirect the light; requiring use of one or more hands to effect the light redirection, hands that may be busy doing other jobs. Such lights may also be found in combination with magnifiers and are referred to as magnifier lights. Headlamps are also provided, and through the use of straps and/or a helmet, can be mounted on a user's head and can be redirected by moving the head although with limits. Such lights can be provided with a pivot to assist in the redirection.

Such lights, while being somewhat effective, have limits, particularly in the ability to redirect over a large range of adjustment and sometimes being fixed in place or requiring hands to redirect.

There is thus a need for an improved light system permitting of a wide range of adjustment and means to effect mounting on a person for use.

SUMMARY OF THE INVENTION

The present invention involves the provision of a light system with a directable light source. The light system includes an arm having first and second pivot means associated therewith. A light mount is associated with the first pivot means and is operable to provide mounting for a light and pivoting of the light about a first pivot axis. A light is removably mounted to the light mount and is preferably battery powered. A mount device is associated with the second pivot means and is operable for mounting to the arm to permit pivoting of the arm about a second pivot axis that is offset from the first pivot axis. The first and second pivots permit multiple axis pivoting of the light for direction and some of the light mounts permit mounting the light on a person for hands free movement of the light.

DETAILED DESCRIPTION OF THE INVENTION

Figure 1:
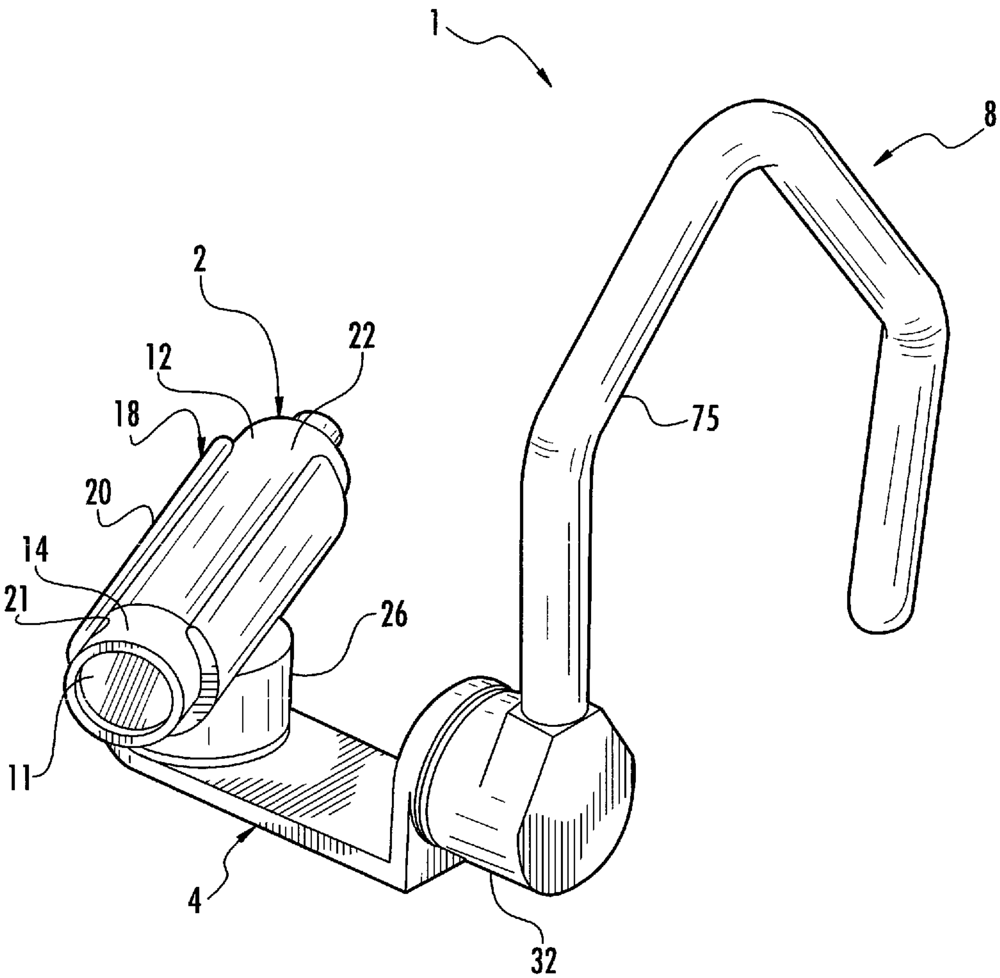
FIG. 1 is a perspective view of one form of a light system with a directable light beam.
Figure 2:
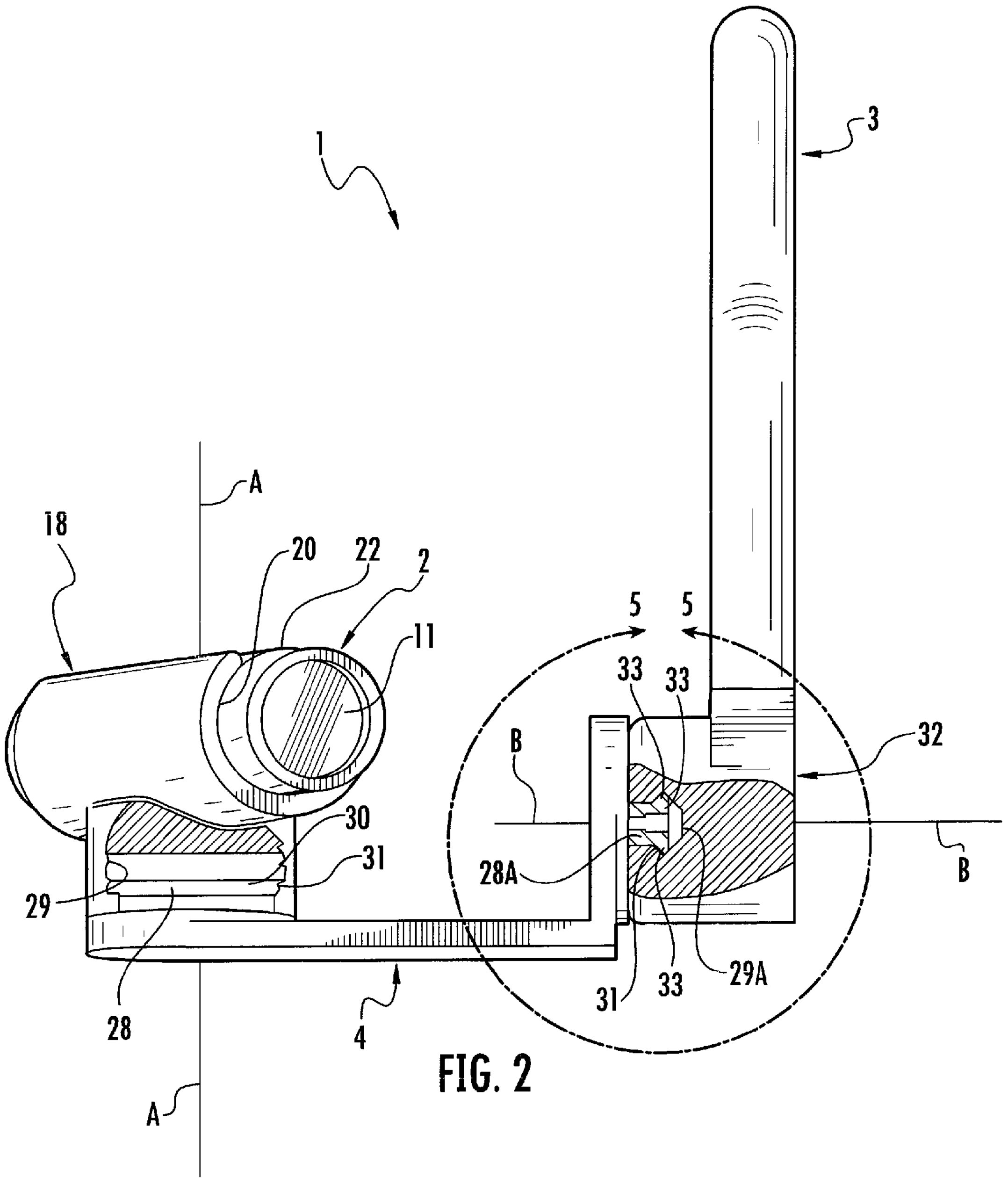
FIG. 2 is a plan view of the light system of FIG. 1 with portions broken away to show structural detail.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated. Like numbers used throughout this application represent like or similar parts and/or construction.

The reference numeral 1 designates generally a light system including a light assembly 2 mounted to a pivot assembly that is configured to permit multiple axis pivoting of the light 2 for directing a light beam as desired. A mount device, designated generally 8, is provided for mounting of the pivot assembly 4 and to provide support for the light 2.

The light assembly 2 is preferably battery powered and utilizes a high efficiency lamp 11 such as an LED to provide a light beam as desired. The light assembly 2 includes a generally cylindrical housing 12 adapted to contain batteries and support the lamp 11. The bezel 14 can be threadably mounted to the housing 12 and can be used as part of an on/off switch mechanism.

The light assembly 2 is removably mounted to the pivot assembly 4 via a light mount 18. As shown, the light mount 18 includes a tubular member 20 having an interior surface 21 sized and shaped to frictionally engage an outer surface 22 of the light assembly 2. At least one end of the member 20 is open to provide means for inserting the light assembly 2 into tubular member 20. Preferably, the interior of the tubular member 20 and the exterior of the housing 12 are generally cylindrical to permit relative rotation and relative longitudinal movement therebetween.

A pivot 26 is provided to connect the light mount 18 to the pivot assembly 4 for rotation about a pivot axis A. As shown, the pivot 26 utilizes a post 28 receivable in a socket 29. The post 28 may be in either of the pivot assembly 4 or the light mount 18 and the socket 29 in the other. In a preferred embodiment, the post 28 can have a flange 30 receivable in an undercut 31 in the socket 29 to provide for a snap lock assembly. Friction between the post 28 and the surface defining the socket 29 can be used to maintain the light mount 18 in a selected pivoted position.

A second pivot 32 is provided to connect the pivot assembly to a mount device 8. Like the pivot 26, the pivot 32 can utilize a post 28A and a socket 29A. The post 28A may be part of the pivot assembly 4 or mount device 8 and the socket 29A part of the other. The post 28A can be split, having a pair of spaced legs 33. The pivot assembly 4 can rotate about pivot axis B and the light assembly 2 about the axis A. The pivot axes A, B have different orientations and preferably are generally orthogonal to one another. The axes A, B may also intersect. In a preferred embodiment, the pivot assembly 4, the light mount 18 and the posts 28, 28A are of resiliently deformable polymeric material to facilitate their assembly with snap lock assembly techniques.

Figure 3:
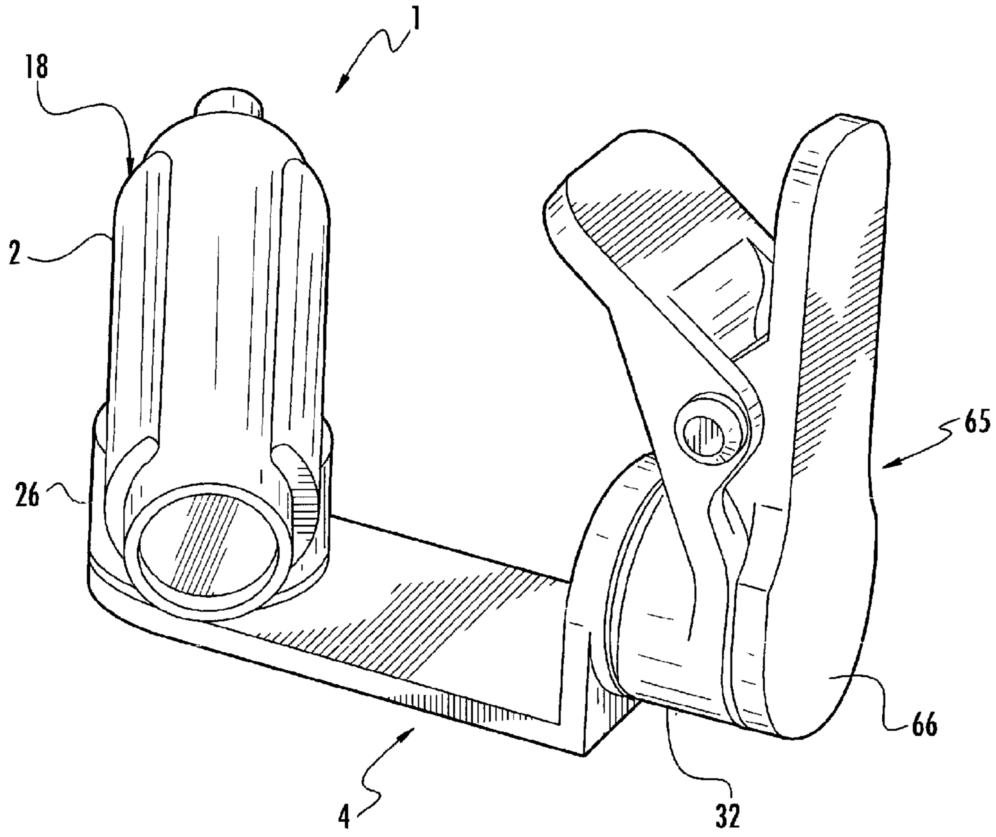
FIG. 3 is a perspective view of a second form of mount for the light system.
Figure 4A:
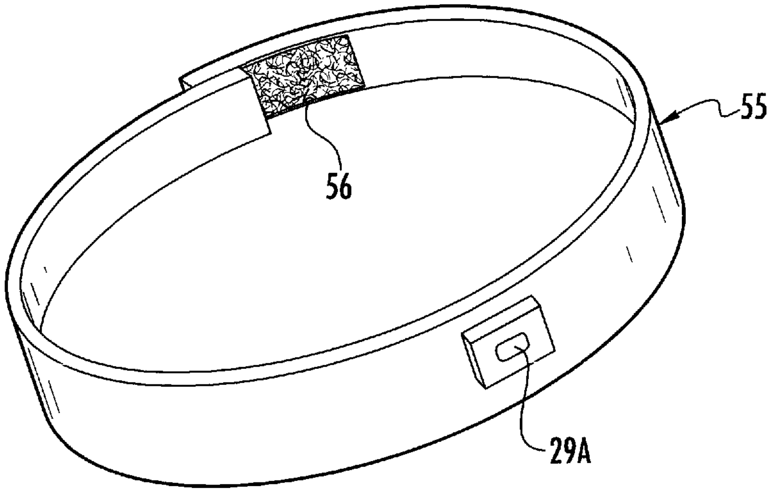
FIG. 4A is a perspective view of an adjustable band type of mount usable with the light system.
Figure 4B:
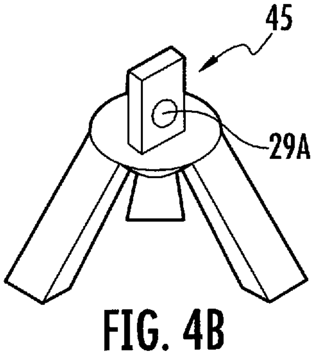
FIG. 4B is a perspective view of a tripod type of mount usable with the light system.
Figure 4C:
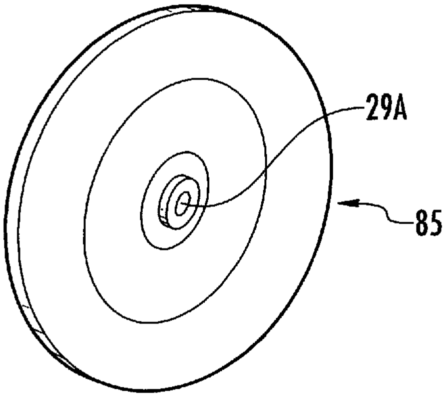
FIG. 4C is a perspective view of a suction cup type of mount usable with the light system.
Figure 5:
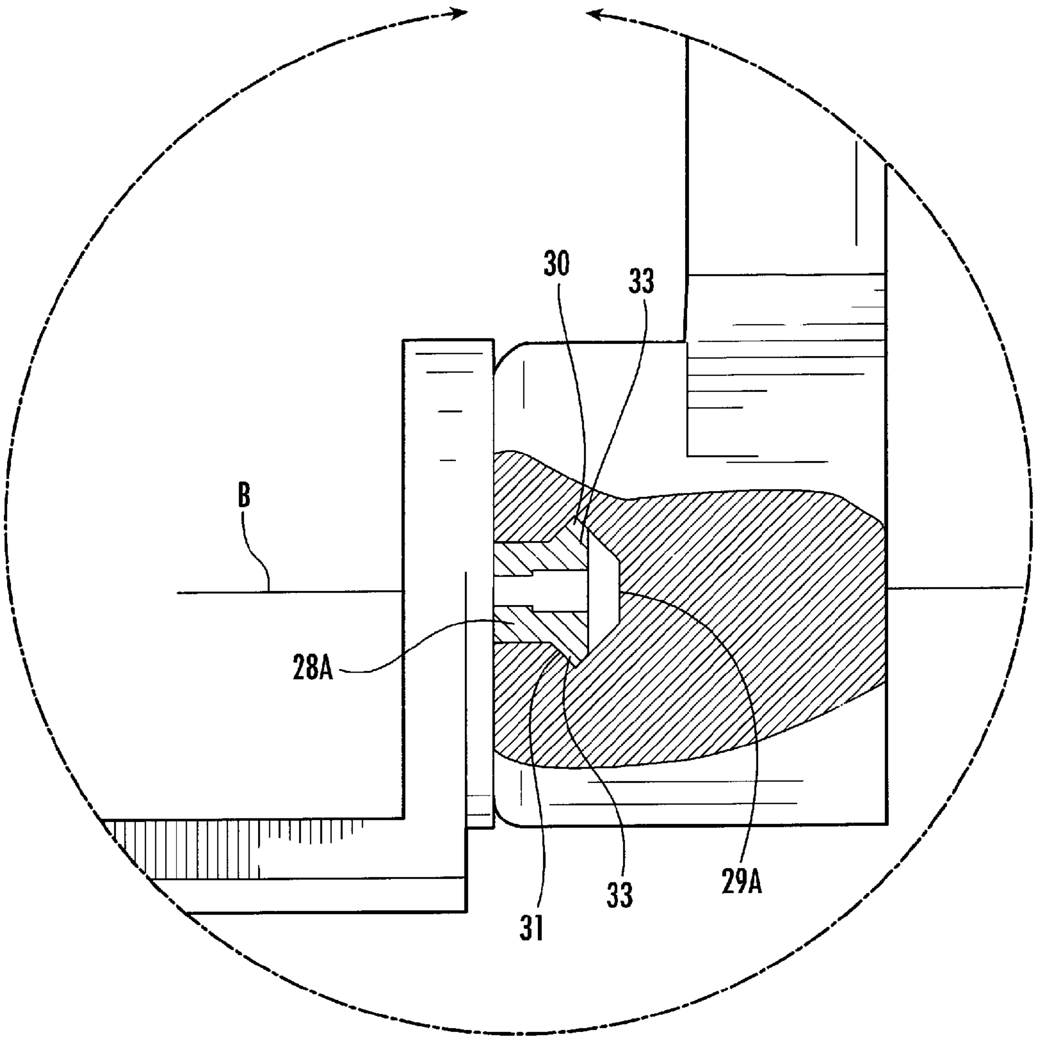
FIG. 5 is a partial section view taken along lines 5-5 of FIG. 2.

The pivot assembly 4 is pivotally mounted to a mount device. The Figures show several versions of mount devices. Mount device 45 (FIG. 4A-C) is a tripod that can be rested on a surface like a table for use. Mount 55 is an adjustable strap that can be used to mount the light assembly 2 and pivot assembly 4 on a users head, arm or the like. It may comprise a hook and loop fastener device 56 to effect securement and size adjustment. Mount 65 (FIG. 3) includes a spring clip 66 that can be used to mount the light assembly 2 and pivot assembly 4 on a person's clothing, eyeglasses or hat, or to another object such as a sun visor, head magnifier or the like as desired. The mount 75 is in the form of a hook adapted to mount a light assembly 2 and pivot assembly 4 to a person's ear. Left and right ear hooks may be provided in the kit. A mount 85 can be provided in the form of a suction cup to fix the light system 2 to an object having a relatively flat and smooth surface for support.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A light system with a directable light source, the light system comprising:

an arm having a first and a second pivot assembly associated therewith;

a light mount associated with said first pivot assembly and operable to pivot about a first pivot axis, said light mount having an inner and an exterior surface, said exterior surface including a first portion of said first pivot assembly for connection of said light mount to said arm for rotation about said first pivot axis, a second portion of said first pivot assembly is provided on a first end of said arm, said first pivot assembly utilizing a post receivable in a socket, said post having a split distal end defining a pair of spaced legs, at least one of said spaced legs including a portion of a flange, said pair of spaced legs being formed from a resilient material to allow inward flex thereby allowing said portion of a flange to pass through an aperture so that said portion of a flange catches on an undercut to define said first pivot assembly;

a light removably mounted to said light mount; and a mount device associated with said second pivot assembly and operable for mounting to said arm to permit pivoting about a second pivot axis that is offset from the first pivot axis, the first and second pivot axes permitting multiple axis pivoting of the light.

2. The light system of claim 1, wherein said light mount includes a tubular member having an interior surface sized and shaped to frictionally engage an outer surface of said light, said interior surface of said tubular member and said exterior surface of said light being constructed and arranged to permit relative rotation and relative longitudinal movement therebetween.

3. The light system of claim 2, whereby friction is utilized to maintain said light mount in a selected pivoted position with respect to said arm.

4. The light system of claim 3, wherein said first pivot assembly, said light mount and said arm are constructed from resiliently deformable polymeric material to facilitate their assembly with snap lock assembly techniques.

5. The light system of claim 1, wherein said light includes a generally cylindrical housing adapted to contain at least one battery and support a lamp.

6. The light system of claim 5, wherein said light includes a bezel that is threadably mounted to said housing, said bezel functioning as part of an on/off switch mechanism and including at least one electrical contact constructed and arranged so that rotation of said bezel moves said at least one electrical contact into a position that completes a circuit between said at least one battery and said lamp.

7. The light system of claim 1, wherein said mount device is a tripod that can be rested on a surface like a table for use.

8. The light system of claim 1, wherein said mount device is an adjustable strap that can be used to mount the light system and pivot assembly around an object or a portion of a user's body.

9. The light system of claim 8, wherein said adjustable strap includes a hook and loop fastener device to effect securement and size adjustment of said adjustable strap.

10. The light system of claim 1, wherein said mount device includes a spring clip that is constructed and arranged to be used to mount said light system and pivot assembly on a person or object.

11. The light system of claim 1, wherein said mount device is in the form of a hook adapted to mount said light system to a person's ear.

12. The light system of claim 1, wherein said mount device is a suction cup to fix said light system to an object having a relatively flat and smooth surface for support.

13. The light system of claim 1, wherein said light utilizes a high efficiency light-emitting diode lamp to provide a light beam.

14. A portable light system comprising:

a battery powered light assembly removably mounted to a pivot assembly via a light mount, said light mount including a tubular member having an interior surface sized and shaped to frictionally engage an outer surface of said light assembly and an exterior surface of said tubular member having, a first portion of a first pivot for connection of said light mount to said pivot assembly for rotation about a first pivot axis, a second portion of said first pivot is provided on a first end of an arm member said first pivot utilizing a post receivable in a socket whereby friction is utilized to maintain said light mount in a selected pivoted position with respect to said arm member, said post having a split distal end defining a pair of spaced legs, at least one of said spaced legs including a portion of a flange, said pair of spaced legs being formed from a resilient material to allow inward flex thereby allowing said portion of a flange to pass through an aperture so that said portion of a flange catches on an undercut to define said first pivot assembly, a second pivot is provided at a second end of said arm member to connect said second pivot assembly to a mount device and is constructed and arranged for rotation about a second pivot axis said second pivot including a post and a socket whereby friction is utilized to maintain said arm member in a selected pivoted position with respect to said light mount, said post having a split distal end defining a pair of spaced legs, at least one of said spaced legs including a portion of a flange, said pair of spaced legs being formed from a resilient material to allow inward flex thereby allowing said portion of a flange to pass through an aperture so that said portion of a flange catches on an undercut to define said second pivot assembly said first and said second pivot axes having different orientations generally orthogonal with respect to one another, whereby said pivot assembly can rotate about said second pivot axis and said light assembly can rotate about said first axis, said mount device constructed and arranged for securing said portable light system to a surface.

15. The portable light system of claim 14, wherein said pivot assembly, said light mount and said posts are constructed from resiliently deformable polymeric material to facilitate their assembly with snap lock assembly techniques.

16. The portable light system of claim 14, wherein said interior of said tubular member and said exterior of said housing are generally cylindrical to permit relative rotation and relative longitudinal movement therebetween.

* * * * *